United States Patent
Flusche et al.

(10) Patent No.: US 10,144,463 B2
(45) Date of Patent: Dec. 4, 2018

(54) TRANSPORT PLATFORM APPARATUS AND METHOD

(71) Applicant: SUPERIOR ENERGY SERVICES-NORTH AMERICA SERVICES, INC., Houston, TX (US)

(72) Inventors: Mark J. Flusche, Muenster, TX (US); Mark James Hardy, Jr., Houston, TX (US)

(73) Assignee: SUPERIOR ENERGY SERVICES-NORTH AMERICA SERVICES, INC, Houston, TX (US)

( * ) Notice: Subject to any disclaimer, the term of this patent is extended or adjusted under 35 U.S.C. 154(b) by 75 days.

(21) Appl. No.: 14/582,727

(22) Filed: Dec. 24, 2014

(65) Prior Publication Data
US 2016/0186495 A1 Jun. 30, 2016

(51) Int. Cl.
*B62D 57/02* (2006.01)
*B62D 57/032* (2006.01)
*E21B 7/02* (2006.01)

(52) U.S. Cl.
CPC ......... *B62D 57/032* (2013.01); *B62D 57/022* (2013.01); *E21B 7/024* (2013.01)

(58) Field of Classification Search
CPC .... B62D 57/02; B62D 57/022; B62D 57/032; E21B 7/024
See application file for complete search history.

(56) References Cited

U.S. PATENT DOCUMENTS

| | | | | |
|---|---|---|---|---|
| 1,001,299 A | | 8/1911 | Page | |
| 3,230,721 A | * | 1/1966 | De Long | E02B 17/022 37/307 |
| 3,576,225 A | * | 4/1971 | Chambers | B65G 7/02 180/8.5 |
| 3,612,201 A | * | 10/1971 | Smith | E02B 17/022 180/8.6 |
| 3,680,321 A | * | 8/1972 | Bordes | E02F 9/045 180/8.6 |
| 3,734,220 A | * | 5/1973 | Smith | E02B 17/022 180/8.6 |
| 3,807,519 A | * | 4/1974 | Patch | E02F 9/04 180/8.5 |
| 3,911,980 A | * | 10/1975 | McColl | A01G 23/08 144/24.13 |
| 3,921,739 A | | 11/1975 | Rich et al. | |
| 4,198,797 A | * | 4/1980 | Soble | E04B 1/348 254/84 |
| 4,270,877 A | * | 6/1981 | Post | E02B 17/021 254/105 |
| 4,288,177 A | | 9/1981 | Schoonmade | |

(Continued)

*Primary Examiner* — Anne Marie M Boehler
*Assistant Examiner* — Maurice L Williams (57) ABSTRACT

A moveable platform apparatus comprising a platform adapted to receive and support a moveable drilling rig or drilling equipment. The platform comprises a first set of legs connected to the platform, wherein the first set of legs support the platform in a first vertical position above ground, wherein each leg of the first set of legs is extendable with respect to the platform to vertically move the platform. The platform further comprises a second set of legs connected to the platform, wherein the second set of legs support the platform in a second vertical position above ground, wherein each leg of the second set of legs is extendable with respect to the platform to vertically move the platform. A method for a moving a platform apparatus along the ground.

20 Claims, 6 Drawing Sheets

(56) References Cited

U.S. PATENT DOCUMENTS

| | | | |
|---|---|---|---|
| 4,519,468 A | 5/1985 | Mick | |
| 4,940,382 A * | 7/1990 | Castelain | B62D 57/00 |
| | | | 114/222 |
| 5,351,626 A * | 10/1994 | Yanagisawa | B62D 57/032 |
| | | | 180/164 |
| 5,921,336 A | 7/1999 | Reed | |
| 6,068,073 A * | 5/2000 | Roston | B62D 57/028 |
| | | | 180/8.3 |
| 6,581,525 B2 * | 6/2003 | Smith | B62D 55/00 |
| | | | 104/96 |
| 7,819,209 B1 | 10/2010 | Bezner | |
| 8,019,472 B2 * | 9/2011 | Montero SanJuan | B21J 15/14 |
| | | | 180/8.1 |
| 8,025,462 B2 * | 9/2011 | Gleadowe | E02B 17/022 |
| | | | 405/196 |
| 8,051,930 B1 * | 11/2011 | Barnes | B62D 57/028 |
| | | | 180/8.3 |
| 9,073,588 B1 * | 7/2015 | Squires | B62D 57/032 |
| 2007/0215359 A1 * | 9/2007 | Wood | E21B 7/02 |
| | | | 166/379 |
| 2013/0156539 A1 * | 6/2013 | Smith | B62D 57/02 |
| | | | 414/800 |
| 2014/0054097 A1 * | 2/2014 | Bryant | E21F 13/006 |
| | | | 180/8.1 |
| 2014/0231138 A1 * | 8/2014 | Mansperger | E21B 44/00 |
| | | | 175/24 |
| 2015/0240562 A1 * | 8/2015 | Ferrari | E21B 15/00 |
| | | | 52/118 |
| 2015/0275596 A1 * | 10/2015 | Hickie | E21B 19/165 |
| | | | 166/380 |

* cited by examiner

TRANSPORT PLATFORM APPARATUS AND METHOD

FIELD

Embodiments usable within the scope of the present disclosure relate, generally to the field of drilling equipment transportation and, more particularly, to a transport or a walking platform and method for moving a mobile rig, other mobile equipment, or other structures from one position to another position across the ground.

BACKGROUND

It is commonplace in the industry for multiple wells to be located on a single drilling site, some as close in proximity as a few feet, while other are further apart. These wells may be worked on simultaneously in some instances and other times in stages. Oftentimes, it is necessary to disassemble one rig setup at a first well location and then move that rig setup to a second well location. The constant assembly and disassembly is a time consuming and costly endeavor, which requires manpower and company assets that could be better allocated elsewhere.

Other moving structures have been used in the industry, as disclosed, for example, in U.S. Pat. No. 7,819,209, U.S. Pat. No. 5,921,336, U.S. Pat. No. 3,921,739, and U.S. Pat. No. 1,001,299.

U.S. Pat. No. 7,819,209 issued Oct. 26, 2010, to Bezner, which is incorporated by reference in its entirety herein, discloses a transport unit and methods of guiding the transport unit linearly and angularly over a surface. The guided transport unit comprises a skid pad to receive a mobile drilling rig, a vertical displacing member engaged with the skid pad, a base operatively associated with the vertical displacing member, and a directional actuator. The base includes a planar element for engaging the surface over which the superstructure is transported, and a carrier for moving the vertical displacing member and skid pad relative to the surface. The directional actuator controls and secures the relationship among the vertical displacing member, the base, and the skid pad for positioning the base in a predetermined direction to engage the surface, setting the carrier to move each skid pad in a predetermined direction across the planar element of the base, and repositioning the base in another direction for movement of the guided transport unit.

The walking platform disclosed in U.S. Pat. No. 7,819,209, discloses lifting cylinders that are not guided and are subject to significant lateral stress during operation, and may not be suited for long term height adjustments of the platform to adapt or raise the platform over a wide range or diverse types of well equipment. In addition, the walking platform needs to support increased weight loads due to the ever increasing equipment needs of drilling operators.

The above art encounters significant fatigue on the apparatus during operation. The side stress imposed on the moving parts while moving drilling structures can decrease the lifespan of these parts and ultimately the longevity of the apparatus. Another issue involves maintaining the transport unit at a desired height for extended periods of time. Yet another issue is raising the transport unit to a height that is sufficient to pass over adjacent well structures, such as BOPs, when moving the rig to another well location. This feature allows the rig to be moved from well to well without disassembling the rig or the well structures.

Accordingly, it would be desirable to provide a walking platform apparatus that provides improved durability, weight supporting capability, sustained operability, and the ability to reposition a rig structure without the need to disassemble the rig structure or surface structures associated with well bores. Consequently, there remains a need for an improved transport platform apparatus. Those skilled in the art have long sought and will appreciate the present invention which addresses these and other problems.

The above general description and the following detailed description are merely illustrative of the generic invention, and additional modes, advantages, and particulars of this invention will be readily suggested to those skilled in the art without departing from the spirit and scope of the invention.

BRIEF DESCRIPTION OF THE DRAWINGS

The accompanying drawings, which are incorporated in and constitute a part of this specification, illustrate an implementation of apparatus consistent with one possible embodiment of the present invention and, together with the detailed description, serve to explain advantages and principles consistent with the disclosure. It is to be understood that in some instances various aspects of the invention may be shown exaggerated or enlarged to facilitate an understanding of the invention. In the drawings.

The present embodiments are detailed below in reference to the figures as listed above.

SUMMARY

The present disclosure is directed to a moveable platform apparatus. The apparatus can comprise a platform adapted to receive and support a moveable drilling rig, a first set of legs connected to the platform, and a second set of legs connected to the platform. The platform has sufficient strength to support drilling equipment. In an embodiment the first set of legs can support the platform in a first vertical position above ground and each leg of the first set of legs can be extendable with respect to the platform to vertically move the platform. In an embodiment of the moveable platform, the second set of legs can support the platform in a second vertical position above ground and each leg of the second set of legs can be extendable with respect to the platform to vertically move the platform. The second set of legs can be used to move the platform horizontally, wherein the second set of legs can comprise a vertical support beam and a foot member horizontally moveable with respect to the vertical support beam.

The present disclosure is further directed to a method for moving a platform apparatus along the ground and supporting the platform above the ground. The platform has sufficient strength to support drilling equipment. The method comprises the steps of supporting a platform above the ground with a first set of legs, lowering a second set of legs to lift the platform until the second set of legs support the platform, moving the vertical support members horizontally with respect to the foot members to move the platform horizontally, and lifting the second set of legs to lower the platform until the first set of legs support the platform. In an embodiment of the method, the second set of legs can comprise vertical support members and foot members. In yet another embodiment of the method, the method can comprise the steps of locking the second set of legs in position with respect to the platform and lowering or lifting the first set of legs to lower or lift the platform relative to the ground.

The present disclosure is also directed to a method for a moving a mobile drill rig with a moveable platform apparatus. In an embodiment the method comprises the steps of driving a mobile rig onto a platform, supporting a platform above the ground with a first set of legs, and extending downwards a second set of legs to lift the platform and the mobile rig until the second set of legs support the platform. The mobile rig comprises a plurality of axles and a plurality of wheels, wherein the number of wheels and axles is sufficient to handle the weight of the mobile rig. The method can further comprise the steps of moving the second set of legs with respect to the ground to move the platform and the mobile rig horizontally and retracting upwards the second set of legs to lower the platform and the mobile rig until the first set of legs support the platform. In an embodiment of the method, the second set of legs can comprise vertical support members and toot members positioned at a lower end of the vertical support member. The step of moving the second set of legs with respect to the ground can comprise moving the vertical support members horizontally along the foot members to move the platform and the mobile rig horizontally.

The foregoing is intended to give a general idea of the invention, and is not intended to fully define nor limit the invention. The invention will be more fully understood and better appreciated by reference to the following description and drawings.

DETAILED DESCRIPTION OF EMBODIMENTS

The present invention generally relates to a moveable (e.g., walking) platform apparatus for supporting, securing and moving drilling equipment and oil rig structures from one location to another. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. The disclosure and description herein is illustrative and explanatory of one or more embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose one or more embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", "first", "second," "forward," "backward," "side-ward," "angled" and so forth are made only with respect to explanation in conjunction with the drawings, and that components may be oriented differently, the instance, during moving or transport operations of the platform and mobile rig. Because many varying and different embodiments may be made within the scope of the concept(s) herein taught, and because many modifications may be made in the embodiments described herein, it is to be understood that the details herein are to be interpreted as illustrative and non-limiting.

Figure 1:
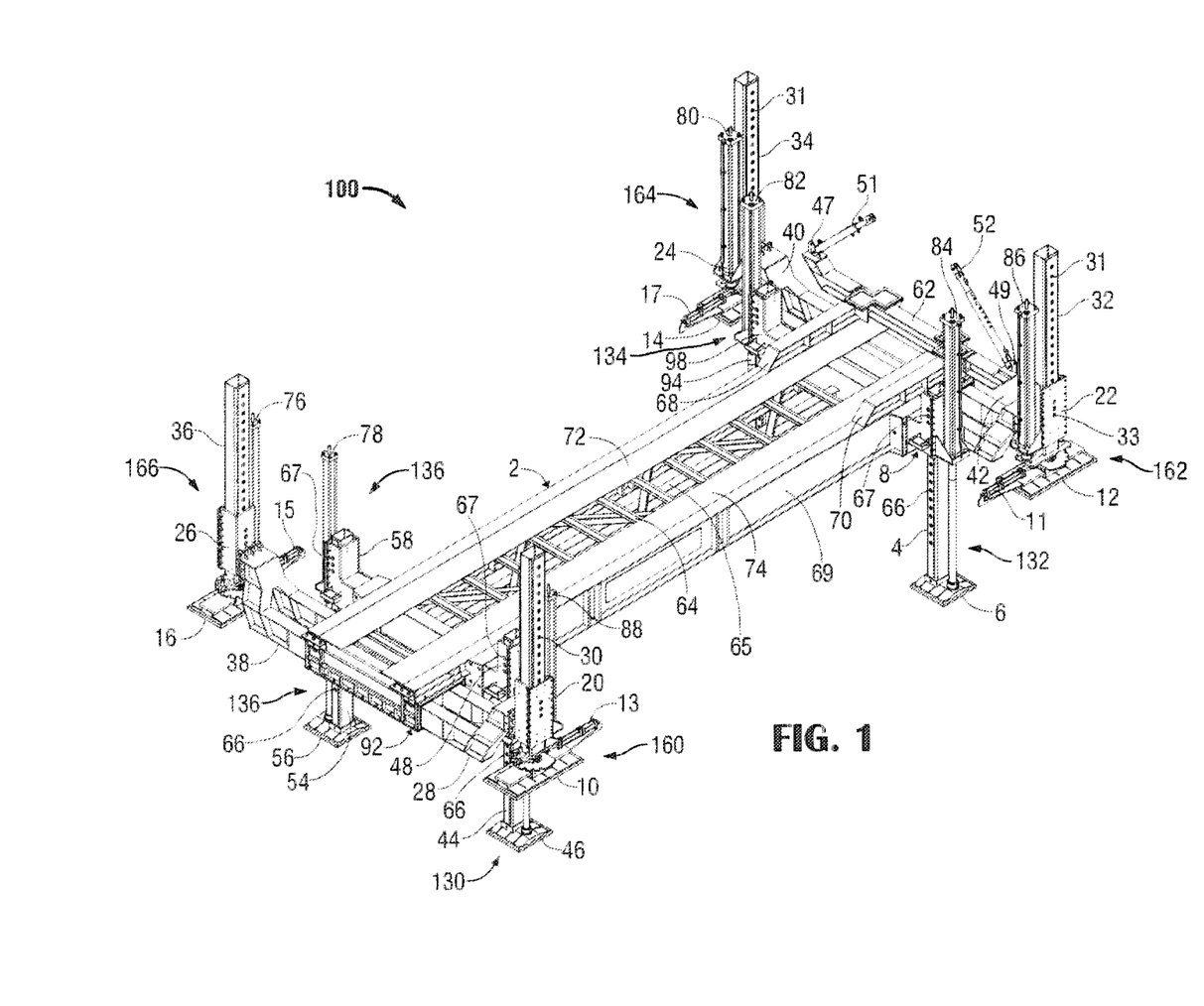
FIG. 1 is a perspective view of a walking platform apparatus without a mobile drilling rig in place in accord with one possible embodiment of the present invention.
Figure 4A:
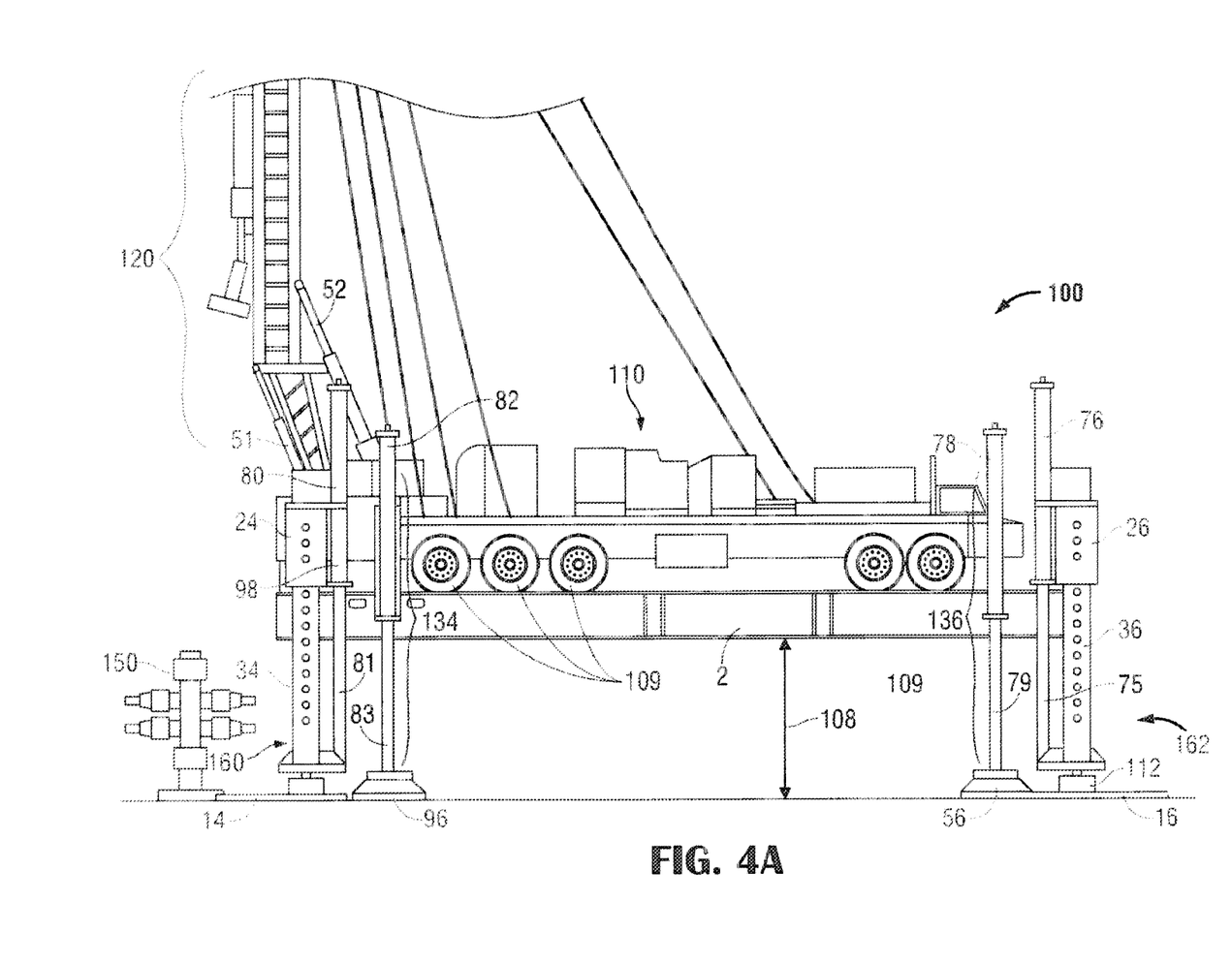
FIG. 4A is a partial elevational side view of a walking platform apparatus with a typical mobile drilling rig in place in accord with one possible embodiment of the present invention.

In overview, and referring more generally to FIG. 1, there is shown one possible embodiment of walking platform apparatus 100, which may also be referred to by other names such as moving platform, walking rig, walking substructure, or the like, and can be transported utilizing a truck, multiple trucks or other suitable carriers (not shown) adapted to move apparatus 100 on highways/roads to a desired location. Although the term "walking" is used consistently throughout the present disclosure, the term should not be used to narrow the scope of the present disclosure, as walking is used to specify that the walking platform apparatus 100 is adapted for moving along the ground while being supported above ground by a plurality of vertical legs or beams. The term "walking" refers to "moving", "transporting", "traveling", and/or "relocating." FIG. 4A shows an embodiment of the walking platform apparatus 100. Once at the desired work site or location, moveable drilling rig 110 can be mounted on walking platform apparatus 100, as shown, whereby wheels 109 of moveable rig 110 can roll onto platform 2 portion of the walking platform apparatus 100. In an embodiment, the moveable rig 110 can drive onto the platform when the platform 2 is lowered or by use of a ramp (not shown). The moveable drilling rig 110 is shown comprising a standard mast assembly 120. The moveable drilling rig 110 can be a standard type mobile drilling rig, which normally must be rigged down, with the mast lowered, to move to a new well or site. However, the disclosed walking platform apparatus 100 permits moveable rig 110 to be moved to closely proximate well sites without the need to lower the mast 120.

Figure 4B:
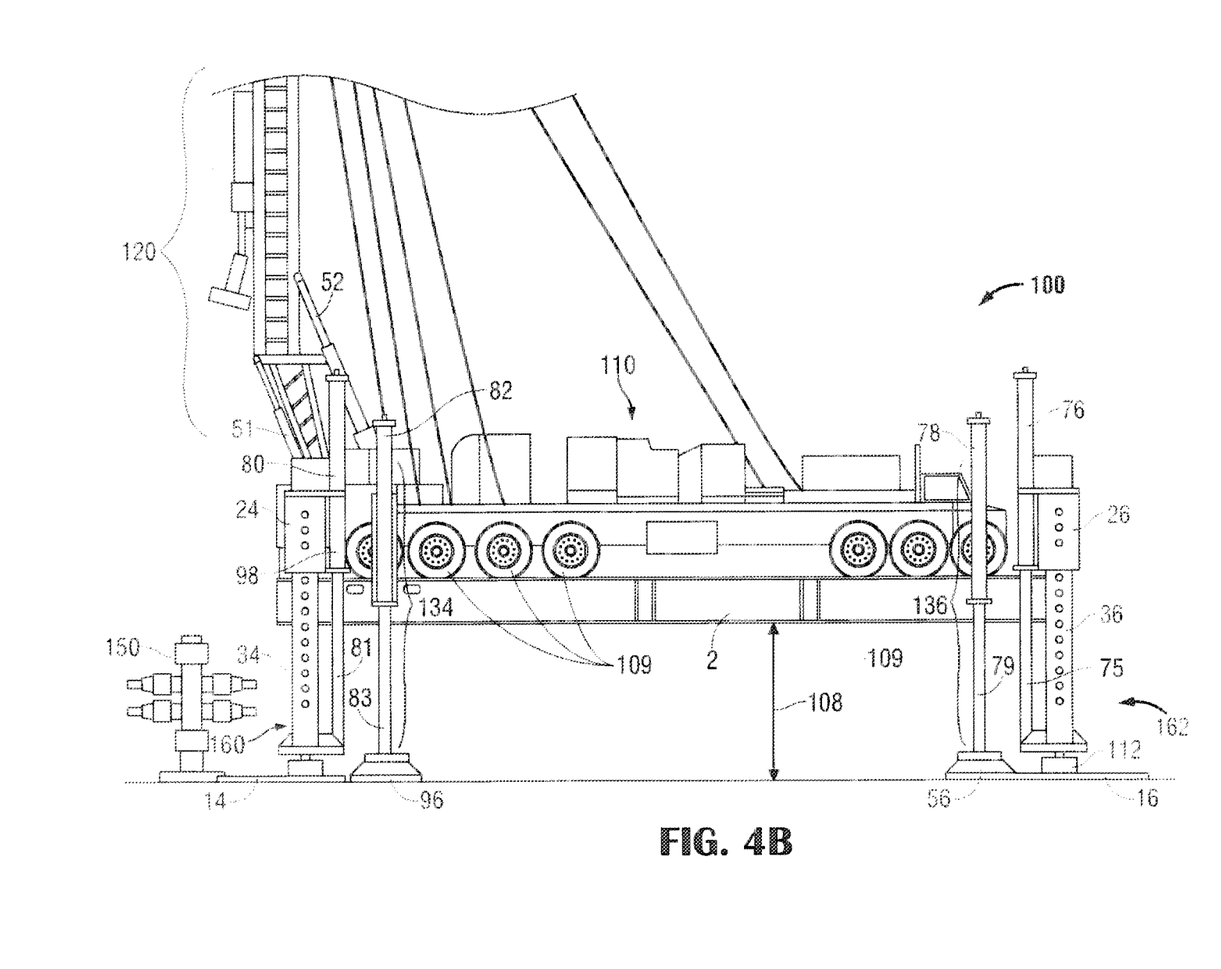
FIG. 4B is a partial elevational side view of a walking platform apparatus with a mobile drilling rig, with additional axles and wheels in place, in accord with one possible embodiment of the present invention.

The additional equipment disclosed in this application, along with other commercially available equipment on the transportable rig, may render typical axle and wheel configurations of transportable rigs incapable of handling the weight of all the equipment. Additional axles and wheel, and a reconfiguration of the axles and wheels, may be necessary to redistribute and handle the additional weight. In one embodiment, the axles and wheels can be moved to obtain a configuration that favorably handles the weight distribution. In addition, the number of axles and wheels can be altered to render the configuration sufficient to handle the weight of the rig. FIG. 4B shows an alternative embodiment of FIG. 4A, wherein additional axles (not shown) and wheels 109 are utilized, on the movable drilling rig, to redistribute and handle the additional weight of the equipment.

Figure 2:
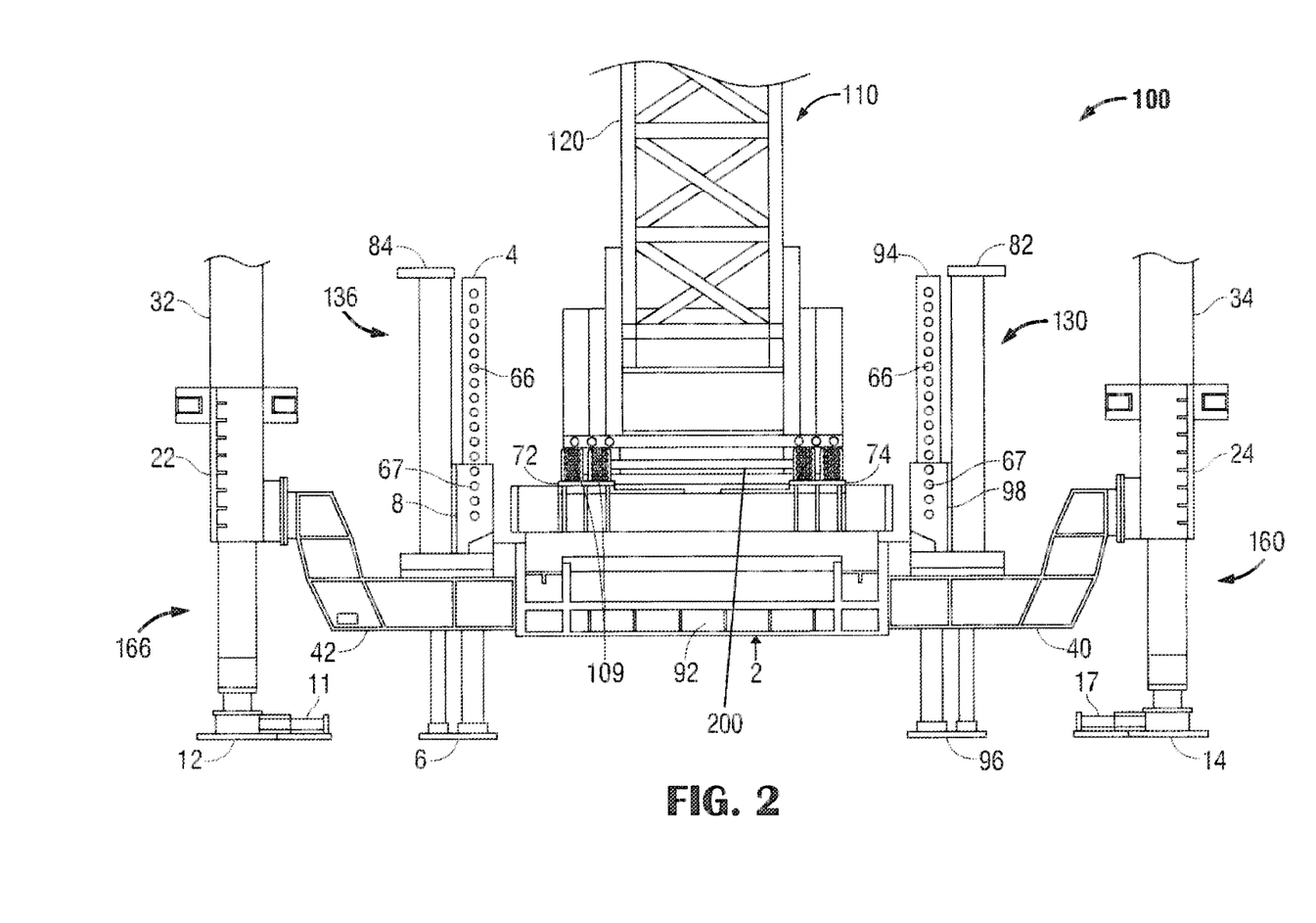
FIG. 2 is a partial elevational end view of a walking platform apparatus with a mobile drilling rig in place on the platform in accord with one possible embodiment of the present invention.

Referring now to FIG. 2, an embodiment is shown wherein an axle 200 has four wheels 109. In one embodiment, at least six (6) axles with at least twelve (12) wheels are provided to redistribute and handle the weight. Variations of the six (6) axle embodiment can have up to twenty-two (22) or twenty-four (24) wheels, depending on whether the front axle has two (2) or four (4) wheels. In another embodiment, seven (7) axles, with at least fourteen (14) wheels, are required to handle the weight of the rig. Variations of the seven (7) axle embodiment can have up to twenty-six (26) or twenty-eight (28) wheels, depending on whether the front axle has two (2) or four (4) wheels. To accommodate the additional axles, changes may need to be made to the substructure or chassis of the transportable rig. The changes can include, but are not limited to, welding additional plates or joints to the substructure or the chassis.

Referring now to FIGS. 5A-5D, an overview of operation of walking platform is conceptually shown in accord with one possible embodiment of the walking platform apparatus 100. FIGS. 5A-5D depicts one possible embodiment of the invention and may be different in other embodiments of the invention. Some of the elements of FIG. 5A-5D may be exaggerated to illustrate the concept of operation.

Figure 5A:
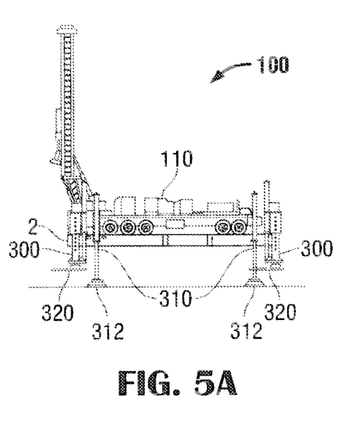
FIG. 5A is a schematic showing a walking platform with a mobile drilling rig in place where the walking platform apparatus is initially supported by extended the stationary legs in accord with one possible embodiment of the present invention.

FIG. 5A shows platform 2 and moveable drilling rig 110 supported on stationary legs 310 (i.e., first set of legs), which can be extended to support and to move the walking platform 100 vertically. Stationary feet 312 can be provided on the ends of stationary legs 310 for stabilizing the stationary legs 310 on the ground and to prevent the legs 310 from sinking into the ground. The platform 2 does not move horizontally when only the stationary legs 310 support platform 2. However, platform 2 can typically move vertically (i.e., up and down) while remaining in a stationary horizontal position.

In an embodiment of the walking platform 100, as described with additional detail below, the stationary legs 310 may be locked in position to maintain the platform 2 at a desired vertical position above the ground. Traveling legs 300 (i.e., second set of legs) are shown partially retracted off the ground, wherein the distance between the traveling legs 300 and the ground is exaggerated for easier viewing. Horizontally moveable feet 320 can be provided on the bottom of traveling legs 300 to enable the walking platform 100 to move horizontally, wherein the moveable feet 320 are shown in a reset in position and ready for horizontal movement as explained below. The horizontal movement can be in any direction, including any angle of movement.

Figure 5B:
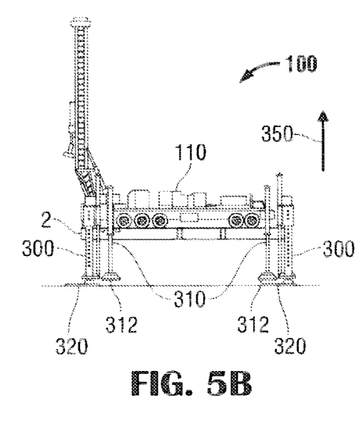
FIG. 5B is a schematic showing the walking platform raised utilizing traveling legs in accord with one possible embodiment of the present invention.

In FIG. 5B, the traveling legs 300 are shown extended against the ground, raising the platform 2 as indicated by arrow 350 while the horizontally moveable feet 320 are still shown in the reset position. As the platform 2 is raised, the weight of the walking platform 100 and the mobile drilling rig 110 is shifted from the stationary legs 310 to the traveling legs 300. Once the platform is lifted, the extended length of stationary legs 310 can remain the same or be adjusted as needed.

Figure 5C:
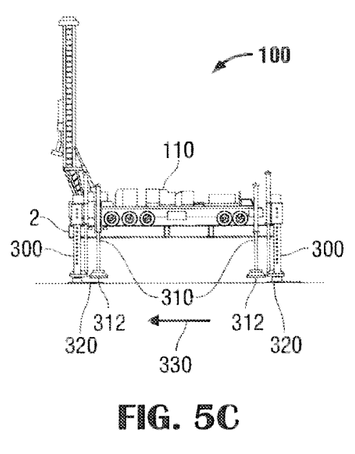
FIG. 5C is a schematic showing the walking platform moving utilizing the traveling leg feet whereupon the feet are moved horizontally to move the rig.

As shown in FIG. 5C, the traveling legs 300 continue to carry the weight of walking platform 100 and the mobile drilling rig 110. The traveling legs 300 are shown at a different position along the horizontally moveable feet 320, as compared with FIG. 5B. Thereby, during moving operations, the walking platform 100 moves horizontally, as indicated by arrow 330, via relative motion between the traveling legs 300 and the moveable feet 320. Specifically, as the vertically oriented traveling legs 300 slide horizontally about the moveable feet 320, which are in static contact with the ground, walking platform 100, and therefore the mobile drilling rig 110, are moved horizontally as indicated by arrow 330. Moveable feet 320 engage the ground and do not slide with respect to the ground, but instead allow the traveling legs 300 to move horizontally thereon, resulting in movement (e.g., walking action) by the walking platform 100.

Figure 5D:
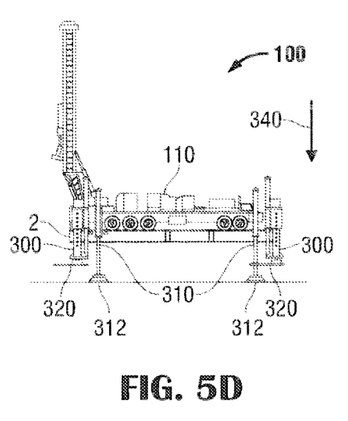
FIG. 5D is a schematic showing the platform lowered again and supported by the stationary legs while the traveling leg feet are reset in accord with one possible embodiment of the present invention.

As shown in FIG. 5D, once the traveling legs 300 reach the end of their travel with respect to the moveable feet 320, the moveable feet 320 can be retracted, lowering platform 2 onto stationary legs 310 and stationary feet 312 as indicated by arrow 340. In this position, the stationary legs 300 again support the weight of walking platform 100 and the mobile drilling rig 110. The horizontally moveable feet 320 can move to the reset position with respect to the traveling legs 300, returning to the position depicted shown in FIG. 5A. The process shown in FIGS. 5A-5D and described above may be repeated as many times as needed to move the walking platform 100 to a desired location. With each iteration, the walking platform 100 can move any desired distance, which is limited by the structure (e.g., length) of the moveable feet 320.

As will be appreciated in view of the present disclosure, the moveable feet 320 can be directed for linear movement of platform 2, wherein all the moveable feet 320 are oriented in the same direction. However, when the horizontally moveable feet 320 are oriented at different angles about the traveling legs 300, the platform 2 can be rotated, moved laterally, or moved in an arc. Thus, the walking platform 100 can move horizontally both linearly and rotationally.

Referring again to FIG. 1, the traveling legs assemblies 160, 162, 164 and 166 can be utilized to move walking platform 100 short distances, with respect to the desired location, to other closely situated well sites, without the need to collapse the mast of the moveable rig. In one possible embodiment, walking platform 100 may move between desired locations separated by relatively short distances in the range of a few feet to a quarter mile or more. The specific desired position of the walking platform can also be precisely adjusted by a few inches or less.

Another advantage of walking platform 100 is the ability to raise and lower platform 2 of walking rig 100 and fix the height thereof utilizing fixed or stationary leg assemblies 130, 132, 134, and 136, whereby different height blowout preventer stacks or other well equipment located on the well surface at each well site can be utilized without interfering with the movement of the walking platform 100. See for example FIG. 4 where the height 108 of walking platform 100 has been adjusted to accommodate the particular height of a particular BOP 150.

Turning again to FIG. 1, which shows a perspective view of walking platform 100 in accord with one possible embodiment of the present invention. The Figure depicts a load supporting chassis 92, which comprises a plurality of internal beams 64, 65 and external beams 69, which can be used to make up the platform 2 structure, upon which the drilling equipment can be supported. In the example shown in FIG. 1 wheels of mobile moveable rig (110, see FIG. 4) roll along relatively flat wheel pads 72, 74. The wheel pads 72, 74 comprise a surface adapted for wheels, which roll thereon, until engaging mobile rig stops 68, 70. A mast attachment base 62 is affixed at one end of chassis 92, adjacent mobile rig stops 68, 70. Two mast support arms 51, 52 are further shown mounted to the mast attachment base 62 and to the lower portion of the mast 120 (shown in FIGS. 2 and 4). The mast support arms 51, 52 can be usable to reinforce the lateral stability of the mast assembly 120 by propping the mast assembly against the structure of the walking platform 100.

The depicted mast support arms 51, 52 can be pivotally moveable at pivot points 47, 49, and adjustable in length, thereby allowing the mast support arms 51, 52 to accommodate different mast configurations. In one embodiment, the platform 2 can be sized and designed to provide sufficient strength and space to support stationary drilling equipment that can be loaded by a crane or other device. In this embodiment, a base plate (not shown) may be utilized to support the drilling equipment weight by distributing the weight of the drilling equipment to the supporting chassis 92, internal beams 64, 65 and external beams 69 of the platform 2 structure.

Referring still to FIG. 1, in one possible embodiment of the walking platform 100, the platform 2 can be supported in position by stationary leg assemblies 130, 132, 134, and 136 (i.e., first set of legs), which include vertical stationary beams 4, 44, 54, 94 and the associated stationary hydraulic lifting cylinders 78, 82, and 84 (fourth cylinder not shown), which can comprise essentially the same construction. The stationary legs 130, 132, 134, and 136 can be extended and retracted but preferably do not engage the ground when walking platform 100 moves horizontally, as discussed hereinbefore. The stationary leg assemblies 130, 132, 134, and 136 can be mounted laterally outwardly from platform 2, which gives additional lateral stability to walking platform 100, especially when the walking platform 100 is raised and/or the mast assembly 120 (see FIG. 4) is erected upwards. However, in other embodiments of the walking platform 100, the stationary legs 130, 132, 134, and 136 can be positioned closer to the platform 2 or beneath the platform 2. The stationary legs 130, 132, 134, and 136 can be positioned on opposite ends, and opposite sides of platform 2, as shown for providing the walking platform 100 favorable or high stability.

To accommodate the need for reliably and rigidly maintaining the platform 2 at a desired height for extended periods of time, the platform 2 can be locked in position once the hydraulic lifting cylinders 78, 82, and 84 lift the platform. FIG. 1 further depicts stationary beams 4, 44, 54, and 94, which comprise a plurality of vertically oriented height adjustment holes 66 extending therethrough. The adjustment holes 66 can be aligned with corresponding selected sleeve guide holes 67 (See also FIG. 2) in corresponding stationary beam guides 48, 8, 98, 58, and a locking shaft or a pin (not shown) can be extended therethrough to lock the stationary legs 130, 132, 134, and 136 in desired position to achieve a desired platform 2 height. The locking pin, can fixably and reliably engage the stationary legs 130, 132, 134, and 136 with the corresponding stationary guides 48, 8, 98, 58, whereby the lifting cylinders 78, 82, and 84 can then be depressurized. Other locking means can also be utilized besides shafts or pins. In the embodiment depicted in FIG. 1, beam guides 48, 8, 98, 58 comprise square or rectangular cross-sections that receive the corresponding square or rectangular cross-sectional shape of stationary beams 44, 4, 94, 54. Accordingly, holes in beams guides 48, 8, 98, 58 are constrained to overlay each other at the selected heights. In other embodiments of the walking platform 100, differently shaped beams, such as triangular or round beams, can be utilized within the scope of the present disclosure.

Stationary beams 44, 4, 94, 54 are each associated with corresponding stationary hydraulic height adjustment actuators 84, 82, 78 that are utilized to extend/retract each stationary beam. In an embodiment of the walking platform apparatus 100, stationary leg 132 includes height adjustment means, which can comprise a stationary beam 4 attached to stationary foot 6 on one end and disposed within a stationary beam guide 8 on an opposite end. Stationary beam guide 8 is fixedly attached to platform 2. Hydraulic assembly 84 is attached to both stationary foot 6 and stationary beam guide 8, whereby the vertical height of platform 2 can be adjusted by actuating hydraulic assembly 84. Once the height of platform 2 is adjusted to a desired height, whereby the stationary beam holes and stationary guide holes are aligned, a corresponding pin can be inserted into a corresponding hole to affix or lock the height. After locking beam 4 in position, the pressure can be released from hydraulic assembly 84. The remaining stationary legs 130, 136, and 134, can comprise the same or similar design as the stationary leg 132. While the hydraulic cylinders could be used to maintain the height of platform 2, this would require continually adjusting pressures in the hydraulic cylinders 84, 82, 78 due to leakage and/or other pressure loses.

As further depicted in FIG. 1, the stationary beams 44, 4, 94, 54 are attached to stationary feet 46, 6, 96, 56 on one end and received within corresponding stationary beam guides 48, 8, 98, 58 on an opposite end (stationary foot 96 is shown in FIG. 4, but is not shown in FIG. 1). Stationary beam guides 48, 8, 98, 58 are fixedly attached to platform 2 and the corresponding stationary hydraulic actuators such that when the stationary hydraulic assemblies are actuated, stationary beam guides 48, 8, 98, 58 travel along the vertical axis of stationary beams 44, 4, 94, 54 to increase or decrease the vertical orientation of platform 2 with respect to the surface. Once a desired height is reached for platform 2, retaining pins can be inserted through holes 66 in stationary beams 44, 4, 94, 54 and stationary beam guides 48, 8, 98, 58 to lock and maintain the height of platform 2.

As discussed above, traveling leg assemblies 160, 162, 164, and 166 (i.e., second set of legs), are utilized to move the rig horizontally to the desired locations. Traveling leg assemblies 160, 162, 164, and 166 are sufficiently offset from stationary leg assemblies 130, 132, 134 and 136 to allow rotation and horizontal movement of the traveling feet 10, 12, 14, and 16. The operation of traveling feet 10, 12, 14, and 16 is explained in U.S. Pat. No. 7,819,209, which is incorporated by reference in its entirety.

In the embodiment of the walking platform 100 depicted in FIGS. 1 and 2, the traveling leg assemblies 160, 162, 164, and 166 are on opposite sides and ends generally adjacent the corresponding stationary leg assemblies. Similarly to the stationary legs 130, 132, 134, 136, the traveling leg assemblies 160, 162, 164, and 166 are positioned outwardly from chassis 92, which provides for movement of walking platform 100 during operation without sacrificing stabilization of mobile rig carrier 110.

As depicted in FIGS. 1 and 2, the traveling leg assemblies 160, 162, 164, 166, corresponding traveling beams 30, 32, 34, 36 are attached on a first end to traveling feet 10, 12, 14, 16, and the opposite end of traveling beams 30, 32, 34, 36 are received within traveling beam guides 20, 22, 24, 26 respectively. Traveling beam guides 20, 22, 24, 26 are fixedly attached to bridge beams 28, 42, 40, 38, which are connected with each end of the platform 2 extending laterally on the sides of the platform 2. Each traveling leg assembly 160, 162, 164, 166 can also comprise a hydraulic actuator 88, 86, 80, 76, which can change the vertical position of traveling beams 30, 32, 34, 36 with respect to platform 2, to lift the platform 2.

As explained in more detail in U.S. Pat. No. 7,819,209, actuators 13, 11, 17, 15 are used in conjunction with traveling feet 10, 12, 14, 16 to move walking platform 100 along the ground. Generally, the feet 10, 12, 14, 16, depicted in FIGS. 1 and 146, depicted in FIG. 4, are rotated to the desired direction of movement when the corresponding traveling legs 160, 162, 164, 166 are raised as discussed hereinbefore. The traveling beams 30, 32, 34, 36 are then extended to raise platform 2 upwards, and the actuators 11, 13, 15, 1 slide the traveling beams 30, 32, 34, 36 along the feet 10, 12, 14, 16. The feet can then be lifted up and the actuators can then slide the traveling beams back to reset the travel movement, whereupon the beams can then be used to raise platform 2 again and the process is repeated. Because the traveling beams 30, 32, 34, 36 are guided by the traveling beam guides 20, 22, 24, 26, the lifting hydraulic actuators 88, 86, 80, 76 experience small amounts of lateral loading to increase cylinder life.

When the traveling beams 30, 32, 34, 36 are not in use, then the traveling beams can be pinned or locked in a desired position, e.g. a position off the ground, utilizing locking pins (not shown) inserted into holes 31, 33 in the sides of the traveling beams 30, 32, 34, 36 and traveling beam guides 20, 22, 24, 26. In this way, the hydraulic actuators 88, 86, 80, 76 do not need to be continually operated.

Referring again to FIG. 2, an end view of walking platform 100 in accord with one possible embodiment of the present disclosure is depicted. A mobile rig, carrier 110 is positioned on skid pads 72, 74, which are located on the upper portion of the platform 2. As discussed, platform 2 comprises a chassis 92 assembly made up of support beams 64, 65, 69 (See FIG. 1). In other embodiments, alternative support structure may be used to form the platform 2 consistent with the present disclosure. As discussed previously, after positioning mobile rig carrier 110 on platform 2, whereby wheels 109 (shown in FIG. 4) contact rig stops 68, 70 (See FIG. 1), the stationary beam hydraulic cylinders 84, 82, are actuated, exerting force against stationary feet 6, 96 and elevating platform 2. Retaining pins can then be inserted through guide holes 67 in stationary beam guides 8, 98 and into stationary beams 4, 94 to sustain this desired height. The desired height can depend upon the height of the wellhead, BOP, or other equipment adjacent to or over the well at a particular well site.

Referring also to FIG. 1, when lateral movement of walking platform 100 is desired, traveling beams 32, 34 are lowered into contact with the surface to thereby raise walking platform 100. For this purpose, hydraulic assemblies 80, 86, 76, 88 are actuated to move traveling beams 32, 34, 36, 30 within traveling beam guides 22, 24, 26, 20 until sufficient contact with the ground is made. Once walking platform 100 is raised, then horizontal actuators 11, 17, 13, 15 can move the traveling beams 32, 34, 36, 30 along the traveling feet 12, 14, 10, 16 to horizontally move the walking platform 100.

Referring still to FIG. 1, the traveling leg assemblies 160, 162, 164, and 166 alternately raise and lower walking platform 100. As the traveling leg assemblies are raised above the ground, the stationary leg assemblies 130, 132, 134, and 136 support the walking platform 100 while the horizontal actuators 11, 17, 13, 15 reset the traveling feet 12, 14, 10, 16 in preparation for the next step (i.e., movement).

Figure 3:
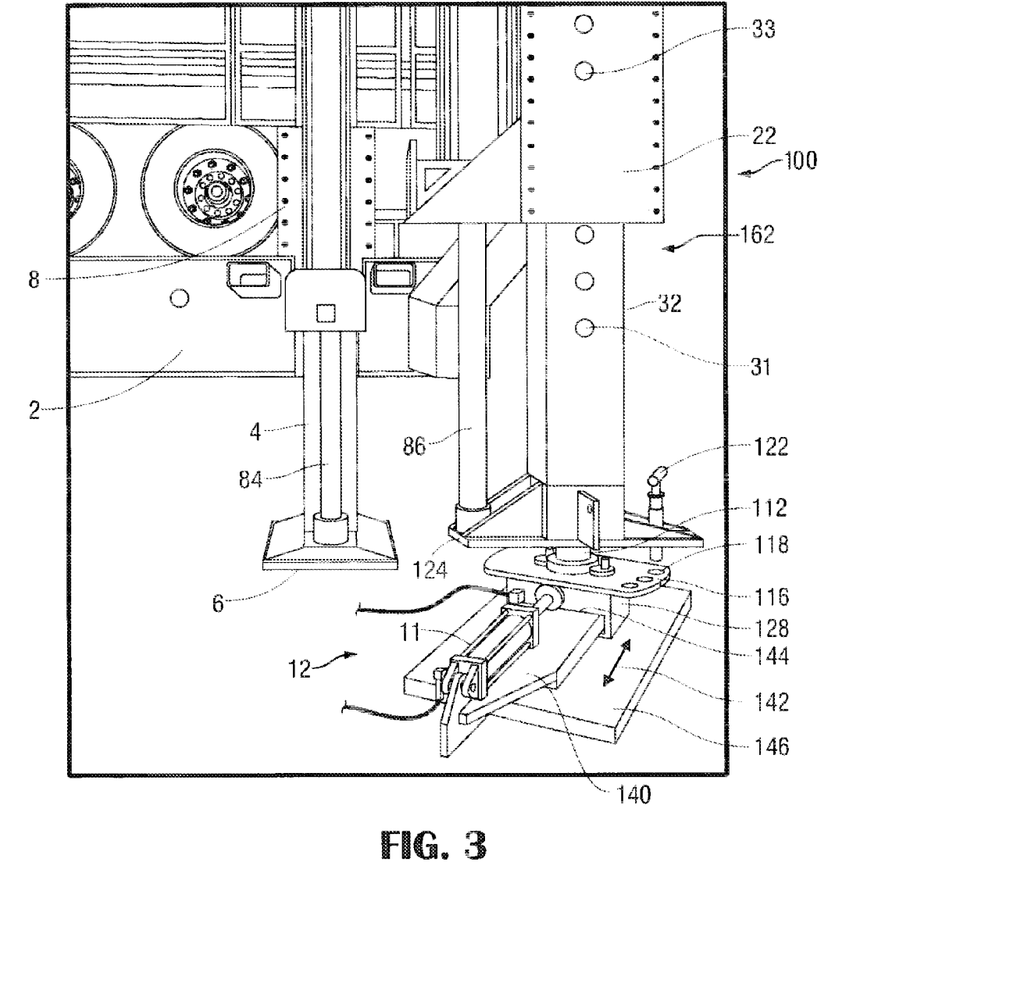
FIG. 3 is an enlarged perspective side view of a walking leg and a stationary leg for a walking platform apparatus in accord with one possible embodiment of the present invention.

Referring now to FIG. 3, a side perspective view of walking platform apparatus 100 is depicted focusing on traveling leg assembly 162 in accord with one possible embodiment of the present invention. In the depicted embodiment, the traveling foot 12 comprises a beam base 124 attached to a lower end of hydraulic cylinder 86 and traveling beam 32. The beam base 124 is rotatably connected to a directional plate 116 via swivel connection 112, which allows the traveling foot 12 to be rotatably moved with respect to traveling beam 32. A guide rail or plate 140 is affixed to base plate 146. A hydraulic cylinder 11 can then be actuated to move or slide the guide bearing 128, and therefore, the traveling beam 32, about the guide plate 140. To prevent lateral movement between the guide bearing 128 and the guide plate 140, the guide bearing can comprise a channel 144 therein, which retains the guide plate 140. The hydraulic cylinder 11 can cause relative motion between the guide bearing 128 and the guide plate 140 in either direction as indicated by arrow 142. Although the internal components of the guide bearing are not depicted, the guide bearing 128 can comprise internal bearings to reduce friction between the guide bearing 128 and the guide plate 140. In another embodiment, the guide bearing 128 and the guide plate 140 can comprise low friction mating surfaces, allowing slippage therebetween.

As further depicted in FIG. 3, once the guide plate 140 is moved with respect to guide bearing 128, then the traveling foot 12 can be raised off the ground using hydraulic cylinder 86. The weight of the walking platform 100 and the mobile rig 100 is then supported by the stationary legs 130, 132, 134, 136 (See FIG. 1). It should be noted that stationary beam hydraulic cylinder 84 can be utilized to raise and lower stationary beam 4 as discussed hereinbefore. In one embodiment, the stationary beam can be pinned or locked into position before and/or after the walking process. In one possible embodiment, walking platform 100 can move up and down during the walking operation.

When the traveling leg assembly 162 is in the raised position, hydraulic actuator 11 can then retract or reset the foot 12 to the starting or set position. When the traveling leg assembly 162 is raised, the foot 12 can also be rotated to orient the foot in the desired direction of travel. For example, if all the feet 10, 12, 14, 16 are oriented in the first direction, then the rig moves in the first direction, which can be parallel to or laterally with respect to the platform 2. If the feet 10, 12, 14, 16 are oriented in different directions, then the walking platform can pivot or move in an arc. The foot 12 can be locked in position to prevent rotational movement thereof during and between movements. Specifically, a retaining pin 122 can be inserted into the directional plate receptacle 118 to fix the position of the traveling foot 12 in the desired direction. Directional plate 116 is depicted fastened about the swivel connection 112 and in connection with the upper end of the guide bearing 128. After the feet 10, 12, 14, 16 are lowered against the ground, the walking platform 100 can move by another increment. This process can continue until walking rig platform 100 reaches the desired destination. In one embodiment, the travelling feet can move in any direction and at any angled direction, including forward, backward, side-wards and any combinations of side-wards with either forward or backwards movements.

In FIG. 4, a side view of an embodiment of a walking platform apparatus 100 with mobile rig carrier 110 positioned thereon is shown. Prior to downhole operations, the mobile rig carrier 110 drives onto ramps (not shown) and onto platform 2. Mast assembly 120 is extended into the upright operational position, perpendicular with respect to platform 2, as is known in the art. Thereafter, arms 1, 52 (See. FIG. 1) are connected to mast assembly 120 to stabilize the mast assembly 120 with respect to platform 2. Accordingly, because walking platform 100 is moveable and is more stable than the mobile rig carrier 110, the mast assembly 120 does not need to be lowered when moving relatively short distances from well site to well site.

As depicted in FIG. 4, the stationary leg hydraulic actuators 78, 82 and associated cylinder shafts 79, 83 can be utilized to support walking platform 100 when the traveling leg assemblies 160, 162 are raised to reset the traveling feet 14, 16 as discussed hereinbefore. Walking beams 34, 36, associated hydraulic actuators 76, 80, and cylinder rods 75, 81 can be utilized to move the walking platform as discussed hereinbefore. It will also be appreciated that the platform height 108 can be controlled to extend above a BOP 150 or other well equipment, allowing the walking platform 100 to move or walk over the BOP 150 or other well equipment when a the mobile rig carrier needs to be moved to a different well.

Referring again to FIG. 1, in summary, in an embodiment of the walking platform 100, the stationary leg assemblies 130, 132, 134, 136 are extended to support the walking platform 110 when the traveling leg assemblies 160, 162, 164, 166 are raised. During the time traveling leg assemblies are raised, the traveling feet 10, 12, 14, 16 reset and can be oriented as desired. The traveling leg assemblies 160, 162, 164, 166 then extend to raise the walking platform 100 and/or support the weight of the walking platform 100 and move the walking platform 100 via the traveling feet 10, 12, 14, 16. The depicted structure provides alternately raising and lowering of the walking platform 100 while moving to the new location. Once at the new location, the stationary leg assemblies 130, 132, 134, 136 can be extended to raise the walking platform 100 to the desired height for operation for a particular BOP and are then locked in position.

In general, it will be understood that such terms as "above," "below," "vertical," "horizontal," "upper", "lower" and the like, are made with reference to the drawings and/or the earth and that the devices may not be arranged in such positions at all times depending on variations in operation, mounting, and the like. As well, the drawings are intended to describe the concepts of the invention so that the presently preferred embodiments of the invention will be plainly disclosed to one of skill in the art but are not intended to be manufacturing, level drawings or renditions of final products and may include simplified conceptual views as desired for easier and quicker understanding or explanation of the invention. One of skill in the art upon reviewing this specification will understand that the relative size and shape of the components may be greatly different from that shown and the invention can still operate in accord with the novel principals taught herein.

Many additional changes in the details, components, steps, and organization of the apparatus and method, herein described and illustrated to explain the nature of the invention, may be made by those skilled in the art within the principle and scope of the presently preferred embodiment described herein. It is therefore understood that within the scope of the appended claims, the invention may be practiced otherwise than as specifically described.

What is claimed is:

1. A method for moving a platform along a ground and supporting the platform above the ground, the platform having an edge extending in a lateral direction and an edge extending in a longitudinal direction that is orthogonal to the lateral direction, the method comprising the steps of:
   supporting the platform above the ground with a first set of legs disposed laterally outward from the platform, wherein the platform has sufficient strength to support drilling equipment;
   lowering a second set of legs to lift the platform until the second set of legs support the platform, wherein the second set of legs are disposed outside of the first set of legs in both the lateral direction and the longitudinal direction, and comprise vertical support members attached to the platform that support the platform independent of the first set of legs, and wherein the second set of legs comprise foot members;
   moving the vertical support members horizontally with respect to the foot members to move the platform horizontally; and
   lifting the second set of legs to lower the platform until the first set of legs support the platform.

2. The method of claim 1, further comprising locking the second set of legs in position with respect to the platform.

3. The method of claim 1, further comprising the steps of: lowering or lifting the first set of legs to lower or lift the platform relative to the ground; and locking the first set of legs in position with respect to the platform.

4. The method of claim 3, wherein the platform comprises a base plate and drilling equipment on the base plate, and wherein the base plate supports the drilling equipment on the platform.

5. The method of claim 1, further comprising the step of moving the foot members with respect to the vertical support members while the first set of legs supports the platform to reset the foot members, wherein the foot members can move in any direction comprising a forward direction, a backward direction, a side-ward direction, an angled direction, or combinations thereof.

6. The method of claim 1, wherein the step of moving the vertical support members horizontally with respect to the foot members, to move the platform horizontally, comprises moving the vertical support members horizontally along the upper side of the foot members to move the platform horizontally.

7. A moveable platform apparatus having an edge extending in a lateral direction and an edge extending in a longitudinal direction that is orthogonal to the lateral direction, wherein
   the moveable platform apparatus includes a platform and is adapted to receive and support a moveable drilling rig, wherein the moveable drilling rig comprises a plurality of axles and a plurality of wheels, and wherein the plurality of axles and the plurality of wheels is sufficient to handle the moveable drilling rig weight;
   and the moveable platform apparatus comprises:
   a first set of legs connected to the platform and disposed laterally outward from the platform, wherein the first set of legs support the platform in a first vertical position above ground, wherein each leg of the first set of legs is extendable with respect to the platform to vertically move the platform; and
   a second set of legs directly connected to the platform, wherein the second set of legs are disposed outside of the first set of legs in both the lateral direction and the longitudinal direction, and support the platform in a second vertical position above ground independent of the first set of legs, and wherein each leg of the second set of legs is extendable with respect to the platform to vertically move the platform.

8. The moveable platform of claim 7, wherein the second set of legs move the platform horizontally.

9. The moveable platform apparatus of claim 8, wherein the second set of legs comprise a vertical support beam and a foot member horizontally moveable with respect to the vertical support beam.

10. The moveable platform apparatus of claim 8, wherein the second set of legs further comprise a horizontal hydraulic actuator to horizontally move a vertical support beam of the second set of legs with respect to a foot.

11. The moveable platform apparatus of claim 7, wherein each leg of the first set of legs comprises a vertical support beam and a locking mechanism operable to lock each leg of the first set of legs in position with respect to the platform.

12. The moveable platform apparatus of claim 7, wherein the first set of legs and the second set of legs comprise vertical hydraulic actuators to vertically move the platform.

13. The moveable platform apparatus of claim 7, wherein the first set of legs are connected with the platform on opposite sides of the platform and the second set of legs comprises at least four legs connected with the platform on opposite sides of the platform.

14. The moveable platform apparatus of claim 13, wherein the plurality of axles of the moveable drilling rig is at least six axles and the plurality of wheels of the moveable drilling rig is at least twelve wheels.

15. A method for a moving a mobile drill rig with a platform, the platform having an edge extending in a lateral direction and an edge extending in a longitudinal direction that is orthogonal to the lateral direction, wherein the method comprises the steps of:
  driving the mobile rig onto the platform, wherein the mobile rig comprises a plurality of axles and a plurality of wheels, and wherein a number of the axles and a number of wheels is sufficient to handle the weight of the mobile rig;
  supporting the platform above a ground with a first set of legs disposed laterally outward from the platform;
  extending downwards a second set of legs to lift the platform and the mobile rig until the second set of legs support the platform independently of the first set of legs, wherein the second set of legs are disposed outside of the first set of legs in both the lateral direction and the longitudinal direction;
  moving the second set of legs with respect to the ground to move the platform and the mobile rig horizontally; and
  retracting upwards the second set of legs to lower the platform and the mobile rig until the first set of legs support the platform.

16. The method of claim 15, wherein the second set of legs comprises vertical support members and foot members positioned at a lower end of each vertical support member; wherein the step of moving the second set of legs with respect to the ground comprises moving the vertical support members horizontally along the foot members to move the platform and the mobile rig horizontally.

17. The method of claim 16, further comprising locking the first set of legs in position with respect to the platform and locking the second set of legs in position with respect to the platform.

18. The method of claim 17, wherein the plurality of axles is at least six axles and the plurality of wheels is at least twelve wheels.

19. The method of claim 15, further comprising extending downwards or retracting upwards the first set of legs to lift or lower the platform and the mobile rig relative to the ground.

20. The method of claim 15, further comprising the step of moving the foot members with respect to the vertical support members while the first set of legs supports the platform and the mobile rig to reset the foot members, wherein the foot members can move in any direction comprising a forward direction, a backward direction, a sideward direction, an angled direction, or combinations thereof.

* * * * *